Figure 1:
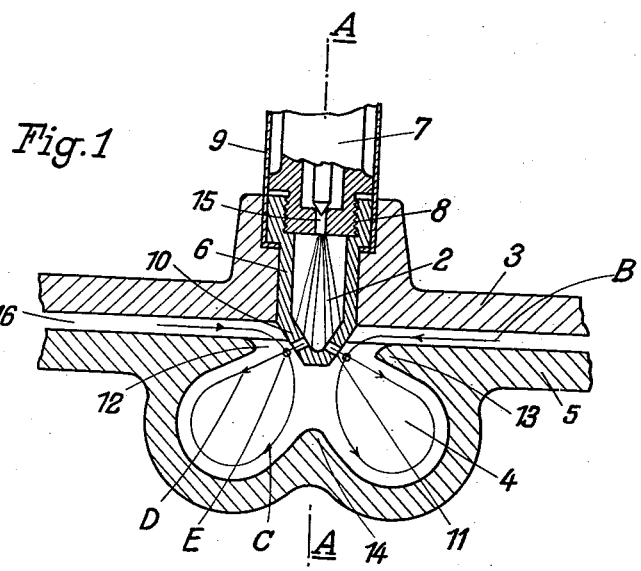

Sept. 5, 1939.  W. BOXAN  2,171,912
INTERNAL COMBUSTION ENGINE
Filed May 3, 1937

Inventor:

Patented Sept. 5, 1939

2,171,912

UNITED STATES PATENT OFFICE 2,171,912

INTERNAL COMBUSTION ENGINE

Walter Boxan, Chemnitz, Germany, assignor to Auto Union Aktiengesellschaft, Chemnitz, Germany Application May 3, 1937, Serial No. 140,558
In Germany May 5, 1936

5 Claims. (Cl. 123—33)

The invention relates to an air-compressing internal combustion engine with self-ignition and pressure injection, more particularly for fuels which ignite with difficulty, in which the main part of the air of the charge is forced over into an eddy chamber.

Engines of this kind are known in which the fuel is injected through an ignition chamber with a broad opening. In this case the ignition chamber is arranged between the injection nozzle and the eddy chamber; it has simply the object of igniting the fuel in order to avoid the detrimental influence on the combustion of the delay in ignition which would occur with direct injection into the eddy chamber. Especially with fuels which ignite with difficulty, that is principally oils from brown coal and pit coal, this step is not sufficient to ensure satisfactory combustion. The injected fuel is not sufficiently worked up mechanically and thermally on its way to the ignition chamber so as to be completely taken up to the charge air in the eddy chamber. The heat content of the eddy chamber is much too small to ensure complete combustion, especially of the fuel particles which ignite with difficulty. The result is smoky or sooty running unless an easily ignited fuel, such as good gas oil, is added, which of course reduces the economy of running.

In contradistinction thereto the novelty of the invention consists in the use of a precombustion chamber with throttle openings, through which a fuel gas mixture is blown into the eddy chamber. By this means the running of the engine can be made largely independent of the type of fuel used. By means of the precombustion chamber, even fuels which are difficult to ignite, for example oils from brown or pit coal, can be sufficiently physically and chemically worked up before they begin to be burnt in the charge air of the eddy chamber. The precombustion chamber in this case has the object of producing an unsaturated fuel gas mixture by ignition of the injected fuel and of passing this through the throttle openings into the eddy chamber owing to the increase of pressure. The precombustion chamber thus not only reduces the delay in ignition but also it largely prepares the fuel for the combustion and then distributes it over the charge air in the eddy chamber. The use of the precombustion chamber thus makes the combustion independent of the pressure atomisation and of the heat content of the eddy chamber. In this way the combustion can be carried out very completely without any considerable excess of air and even with fuels which hitherto could not be worked up so as to be free from smoke and soot. The running of the engine is therefore as economical as possible, independently of the market conditions of the fuel for the time being.

The arrangement according to the invention is illustrated by way of example in the accompanying drawing.

Figure 2:
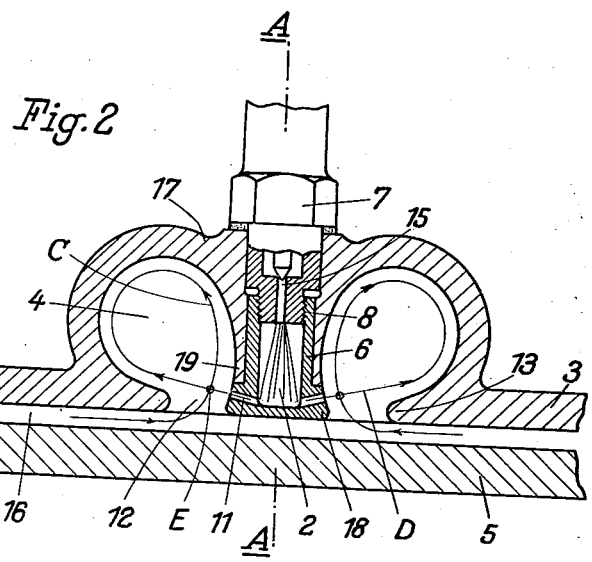

Fig. 1 is a vertical principal section through the combustion chamber of a four-stroke engine, and Fig. 2 is a vertical principal section through the combustion chamber of a two-stroke engine.

In the example according to Fig. 1 the precombustion chamber 2 is arranged in the cylinder cover 3 and the eddy chamber 4 is arranged in the working piston 5 symmetrically with respect to the cylinder axis A. The precombustion chamber 2 consists of an insertion 6 which is directly connected with the injection nozzle 7 by means of a screw thread 8. The nozzle 7 is surrounded by a tube 9 inserted in the cylinder cover 3. The insertion 6 is closed by means of a conical head 10 having a number of atomising holes 11. The eddy chamber consists of a rounded recess in the piston into which the head 10 projects, leaving free an annular overflow passage 12. The atomisation holes 11 are directed towards the wall 13 of the eddy chamber 4 which bounds the overflow passage. A conical extension 14 at the bottom of the eddy chamber 4 is oppositely directed to the head 10 of the insertion 6. The nozzle 7 injects into the axis of the insertion 6 at 15.

During the compression stroke of the piston 5 a small part of the charge air is transferred to the precombustion chamber 2 and the greater part into the eddy chamber 4. In the head 10 of the insertion 6 the individual air streams impinge one against another and form a united current directed oppositely to the nozzle opening 15, into which the fuel is injected and ignited. Towards the end of the compression stroke the charge air flowing out of the space 14 into the eddy chamber 4 is throttled in the passage 12 and is deflected at the parts 10, 14, while its velocity is increased so that a regular eddy movement is obtained in the eddy chamber 4. Approximately at the upper dead centre point, the fuel gas mixture in the precombustion chamber 2 is blown in the direction D through the atomisation holes, whereby it crosses the air stream at E and meets the gas air current C in the opposite direction. In this way a rapid and complete mixing of the fuel gas mixture with the charge air is obtained, after which the combustion takes place directly.

In the example according to Fig. 2 the precombustion chamber 2 and the eddy chamber 4 are arranged in the cylinder cover 3 symmetrically to the cylinder axis, the precombustion chamber 2 being arranged inside in the eddy chamber 4. The chamber 2 consists of an insertion 6 arranged in a cylindrical extension 19 of the eddy chamber 4 and connected by means of a screw thread 8 with the injection nozzle 7 inserted tightly in the bottom 17 of the eddy chamber 4. The insertion 6 is closed by means of a head 18 which is flush with the lower boundary edge of the cylinder cover 3. The head 18 is provided with a number of throttle openings 11 which are directed towards the wall 13 of the eddy chamber 4 which bounds the overflow passage 12. The parts 18, 19 in this case act as guide surfaces for the charge air transferred from the space 16. There is no change in the action of the engine itself.

The chamber 2 is very small as compared with the eddy chamber 4, since the precombustion can be completed without a sufficient quantity of air. The insertion 6 ensures that the fuel injected into the chamber 2 will always find suitable conditions for ignition irrespective of the type of fuel. The precombustion has the object of heating the walls of the insertion 6 and splitting the fuel components which ignite with difficulty and supplying the pressure energy for atomising the fuel gas mixture. The atomisation is guided in such a manner that it meets the air eddy of the chamber 4 in a definite manner, for example at an angle and in counter-current, whereby a favourable distribution of the fuel gas mixture over the charge air is ensured and the main combustion can be carried out practically without excess of air.

The invention is not restricted to this constructional example; it can be applied to all eddy chamber engines irrespective of the shape of the eddy chamber and the position in which it is arranged on the engine. It is immaterial for the invention on what system the engine works, whether in two-stroke or in four-stroke.

What I claim is:

1. An internal combustion engine of the air compressing, self-ignition and pressure injection type for liquid fuels, comprising in combination with a cylinder and a reciprocating piston, an annular cavity of substantially round cross section formed in one of said members and having an annular opening communicating with the cylinder space above the piston to form an eddy current confining chamber for the air compressed by the compression stroke of the piston, a fuel injection valve, and a precombustion chamber arranged between the fuel injection valve and the eddy chamber and provided with throttle openings through which a fuel gas mixture is injected into the annular eddy cavity, said openings being inclined at an angle to the outer portion of the circular wall of the cavity to produce substantially a tangential introduction of the mixture into the cavity, said fuel mixture being constrained to move inwardly in countercurrent to the outward constrained movement of the compressed air in the eddy chamber, the fuel mixture from the precombustion chamber and the countercurrent compressed air circulating in the eddy chamber serving to intimately commingle the air and gas mixture within said eddy chamber.

2. An internal combustion engine of the air compressing, self-ignition and pressure injection type for liquid fuels, comprising in combination with a cylinder and a reciprocating piston, an annular cavity of substantially round cross section formed in the crown of the piston and having an annular opening communicating with the cylinder space above the piston to form an eddy current confining chamber for the air compressed by the compression stroke of the piston, a fuel injection valve, and a precombustion chamber formed in the cylinder and arranged between the fuel injection valve and the eddy chamber and provided with throttle openings through which a fuel gas mixture is injected into the annular eddy cavity, said openings being inclined at an angle to the outer portion of the circular wall of the cavity to produce substantially a tangential introduction of the mixture into the cavity, said fuel mixture being constrained to move inwardly in countercurrent to the outward constrained movement of the compressed air in the eddy chamber, the fuel mixture from the precombustion chamber and the countercurrent compressed air circulating in the eddy chamber serving to intimately commingle the air and gas mixture within said eddy chamber.

3. An internal combustion engine of the air compressing, self-ignition and pressure injection type for liquid fuels, comprising in combination with a cylinder and a reciprocating piston, an annular cavity of substantially round cross section formed in the cylinder head and having an annular opening communicating with the cylinder space above the piston to form an eddy current confining chamber for the air compressed by the compression stroke of the piston, a fuel injection valve, and a precombustion chamber formed in the cylinder and arranged between the fuel injection valve and the eddy chamber and provided with throttle openings through which a fuel gas mixture is injected into the annular eddy cavity, said openings being inclined at an angle to the outer portion of the circular wall of the cavity to produce substantially a tangential introduction of the mixture into the cavity, said fuel mixture being constrained to move inwardly in countercurrent to the outward constrained movement of the compressed air in the eddy chamber, the fuel mixture from the precombustion chamber and the countercurrent compressed air circulating in the eddy chamber serving to intimately commingle the air and gas mixture within said eddy chamber.

4. An internal combustion engine of the air compressing, self-ignition and pressure injection type for liquid fuels, comprising in combination with a cylinder and a reciprocating piston an annular cavity of substantially round cross section formed in the crown of the piston and having an annular opening communicating with the cylinder space above the piston to form an eddy current confining chamber for the air compressed by the compression stroke of the piston, a fuel injection valve, and a precombustion chamber formed in the cylinder and arranged between the fuel injection valve and the eddy chamber and provided with throttle openings through which a fuel gas mixture is injected into the annular eddy cavity, said openings being inclined at an angle to the outer portion of the circular wall of the cavity to produce substantially a tangential introduction of the mixture into the cavity, said chamber being arranged co-axially with the eddy chamber and projecting into the latter and arranged with respect to said chamber to provide an annular overflow or outlet passage for the circulated air and fuel gas mixture, said fuel mixture being constrained to move inwardly in countercurrent to the outward constrained movement of the compressed air, the fuel mixture from the precombustion chamber and the countercurrent compressed air circulating in the eddy chamber serving to intimately commingle the air and gas mixture within said eddy chamber.

5. An internal combustion engine of the air compressing, self-ignition and pressure injection type for liquid fuels, comprising in combination with a cylinder and a reciprocating piston, an annular cavity of substantially round cross section formed in the cylinder head and having an annular opening communicating with the cylinder space above the piston to form an eddy current confining chamber for the air compressed by the compression stroke of the piston, a fuel injection valve, and a precombustion chamber formed in the cylinder and arranged between the fuel injection valve and the eddy chamber and centrally of said annular eddy chamber and having the end wall thereof arranged flush with the inner top wall of the cylinder head and provided with throttle openings through which a fuel gas mixture is injected into the annular eddy cavity, said openings being inclined at an angle to the outer portion of the circular wall of the cavity to produce substantially a tangential introduction of the mixture into the cavity, said fuel mixture being constrained to move inwardly in countercurrent to the outward constrained movement of the compressed air, the fuel mixture from the precombustion chamber and the countercurrent compressed air circulating in the eddy chamber serving to intimately commingle the air and gas mixture within said eddy chamber.

WALTER BOXAN.